United States Patent [19]
Warrior

[11] Patent Number: 5,764,891
[45] Date of Patent: Jun. 9, 1998

[54] PROCESS I/O TO FIELDBUS INTERFACE CIRCUIT

[75] Inventor: Jogesh Warrior, Chanhassen, Minn.

[73] Assignee: Rosemount Inc., Eden Prairie, Minn.

[21] Appl. No.: 602,712

[22] Filed: Feb. 15, 1996

[51] Int. Cl.$^6$ .................................................. G06F 17/00
[52] U.S. Cl. ................................................. 395/200.2
[58] Field of Search .............. 364/514 R; 395/200.2; 324/713; 327/509; 341/118, 176

[56] References Cited

U.S. PATENT DOCUMENTS

| | | | |
|---|---|---|---|
| 3,670,310 | 6/1972 | Bharwani et al. | 340/172.5 |
| 4,554,631 | 11/1985 | Reddington | 364/300 |
| 4,627,019 | 12/1986 | Ng | 364/900 |
| 4,674,066 | 6/1987 | Kucera | 364/900 |
| 4,817,036 | 3/1989 | Millett et al. | 364/900 |
| 4,821,180 | 4/1989 | Gerety et al. | 364/200 |
| 4,823,306 | 4/1989 | Barbic et al. | 364/900 |
| 4,852,041 | 7/1989 | Nakano | 364/900 |
| 4,855,805 | 8/1989 | Estrada et al. | 364/200 |
| 4,884,287 | 11/1989 | Jones et al. | 375/121 |
| 4,945,473 | 7/1990 | Holtey et al. | 364/200 |
| 4,975,829 | 12/1990 | Clarey et al. | 364/200 |
| 5,007,013 | 4/1991 | Elms | 364/900 |
| 5,424,650 | 6/1995 | Frick | 324/713 |
| 5,481,200 | 1/1996 | Voegele et al. | 324/713 |
| 5,573,032 | 11/1996 | Lenz et al. | 137/486 |
| 5,610,552 | 3/1997 | Schlesinger et al. | 327/560 |

FOREIGN PATENT DOCUMENTS

| 2 243 748 | 11/1991 | United Kingdom . |
|---|---|---|
| WO 93/08652 | 4/1993 | WIPO . |

OTHER PUBLICATIONS

"Automation for the Future: An Integrated Process—Wide Control, Switching and Drive Concept," by M. Deppe et al., *Engineering & Automation*, vol. 17, No. 5, Sep.–Oct. 1995, pp. 14–15.

"HI 311 HART® Serial Interface", SMAR, Sep. 1996, pp. 2–7.

FB BOARD™ Fieldbus Interface Board, SMAR, Sep. 1996, pp. 2–11.

FB STACK™ Fieldbus Communication Stack, SMAR, Oct. 1996, pp. 2–11.

Product Data Sheet 2634 for "Series 7500 System V. Hydrostatic Tank Gauging System Software and Tank Scanning Unit (TSU)," Rosemount Inc. 1988.

Document No. 33–07787, 6810 Series Tank Scanning Unite--Hardware, Instruction Manual, for Varec, a Rosemount Division. (No Date).

Siemens "The New Field Devices Bring You Flexible Communication—Whatever Your System Concept," by Siemens AG of Germany. (No Date).

Document No. FF–94–890, the Fieldbus Foundation, "Fieldbus Foundation Fieldbus Specification Function Block Application Process Part 1," 1996 pp. 1–119.

Document No. FF–94–891, the Fieldbus Foundation, "Fieldbus Foundation Fieldbus Specification Function Block Application Process Part 2," 1996 pp. 1–55.

*Primary Examiner*—Ellis B. Ramirez
*Attorney, Agent, or Firm*—Westman, Champlin & Kelly, P.A.

[57] ABSTRACT

A field device such as a transmitter in a process control system includes conversion circuitry coupled between Fieldbus interface circuitry and transmitter interface circuitry. The transmitter includes a transducer for sensing a process variable and providing a transducer output. Measurement circuitry couples to the transducer output, processes the transducer output and provides a measurement output. The transmitter interface circuitry couples to the measurement circuitry and provides an interface output representative of the measurement output. Further, the transmitter interface circuitry receives a transmitter command and responds in accordance with the transmitter command. The Fieldbus interface circuitry is adapted to couple to a process control loop which operates in accordance with the Fieldbus standard.

24 Claims, 3 Drawing Sheets ly writes Field-
PROCESS I/O TO FIELDBUS INTERFACE CIRCUIT

BACKGROUND OF THE INVENTION

The present invention relates to the process control industry. More specifically, the present invention relates to field devices used in the process control industry which communicate using process control loops which operate in accordance with the Fieldbus communication protocol.

Field devices such as transmitters, are used in the process control industry to remotely sense a process variable. The process variable may be transmitted to a control room for use in controlling the process or for providing information about process operation to a controller. For example, information related to pressure of process fluid may be transmitted to a control room and used to control the process, such as oil refining. Another type of field device, for example, is a valve controller.

One typical prior art technique for transmitting information involves controlling the amount of current flowing through a process control loop. Current is supplied from a current source in the control room and the transmitter controls the current from its location in the field. For example, a 4 mA signal can be used to indicate a zero reading and a 20 mA signal can be used to indicate a full scale reading. More recently, transmitters have employed digital circuitry which communicates with the control room using a digital signal which is superimposed onto the analog current signal flowing through the process control loop. Some techniques send purely digital signals. One example of such a technique is the HART® communication protocol proposed by Rosemount Inc. The HART® protocol and other such protocols typically include a set of commands or instructions which can be sent to the transmitter to elicit a desired response, such as transmitter control or interrogation.

Fieldbus is a communications protocol proposed by the Fieldbus Foundation and is directed to defining a communications layer or protocol for transmitting information on a process control loop. In the Fieldbus protocol, the current flowing through the loop is not used to transmit an analog signal. Instead, all information is digitally transmitted. Further, the Fieldbus standard allows transmitters to be configured in a multi-drop configuration in which more than one transmitter is connected on the same process control loop.

SUMMARY OF THE INVENTION

The present invention is a field device in a process control system which includes conversion circuitry for converting Fieldbus data received from and transmitted on the process control loop formatted in accordance with the Fieldbus standard. The field device includes a control element such as a transducer for sensing a process variable and providing a transducer output or a valve positioner for positioning a valve. Measurement circuitry processes the transducer output and provides a measurement output. Field device interface circuitry couples to the measurement circuitry and provides a field device interface output representative of the measurement output. The field device interface circuitry also receives field device commands and responds in accordance with the field device command. Fieldbus interface circuitry is adapted to couple to the process control loop which operates in accordance with the Fieldbus standard. The Fieldbus interface circuitry includes an I/O Read/Write register, an I/O Control register and an I/O Event register.

The Fieldbus interface circuitry responsively writes Fieldbus data which is received from the process control loop into the three registers. Further, the interface circuitry responsively transmits Fieldbus data on the process control loop based upon data which is read from the registers. Conversion circuitry is located between the Fieldbus interface circuitry and the field device interface circuitry. The conversion circuitry is adapted to write data into the I/O Read/Write, the I/O Control register and the I/O Event register data related to the interface output which is received from the field device interface circuitry. Further, the conversion circuitry reads data from the I/O Read/Write register, the I/O Control register and the I/O Event register and responsively sends a field device command to the transmitter interface circuitry.

DETAILED DESCRIPTION OF THE PREFERRED EMBODIMENTS

Figure 1:
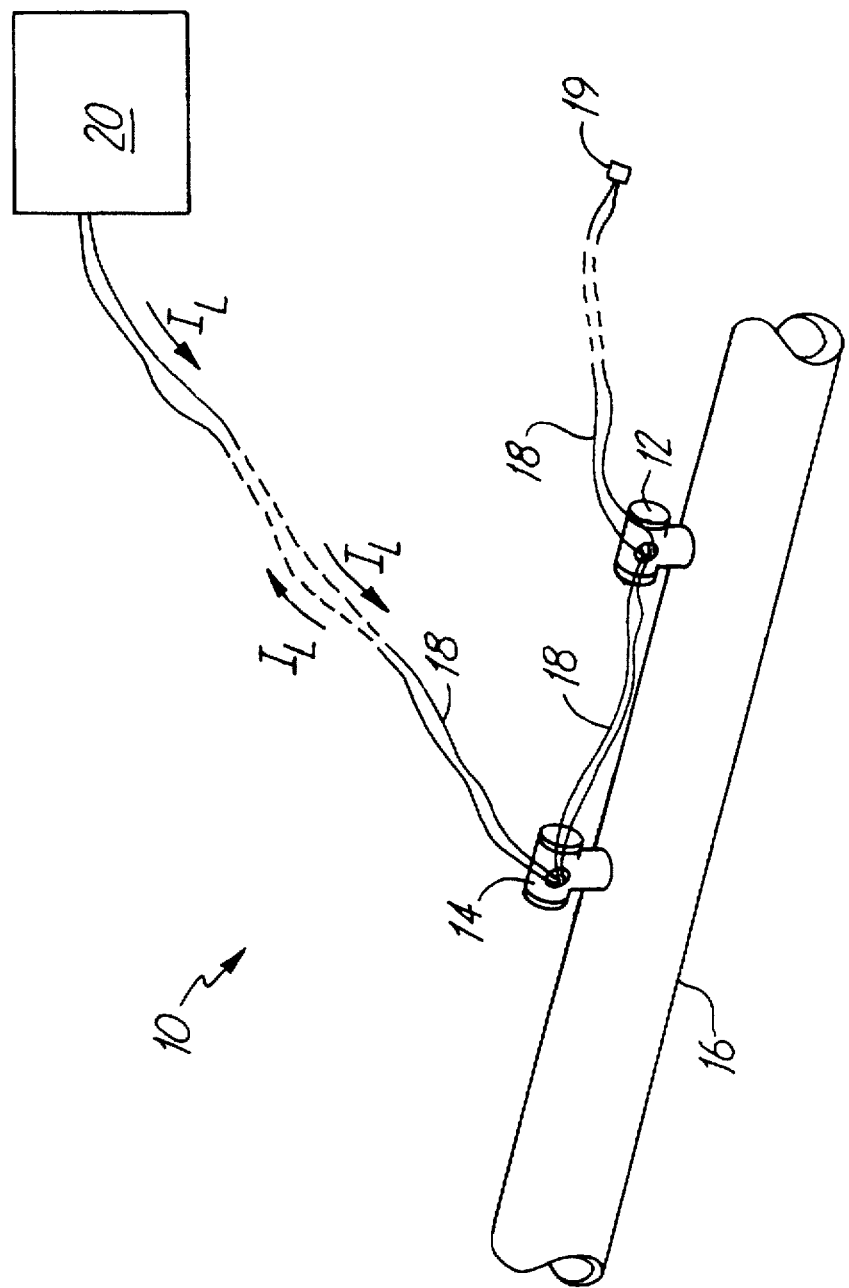
FIG. 1 is a diagram of a process control system including transmitters in accordance with the present invention coupled to a process control loop operating in accordance with the Fieldbus communications standard.

FIG. 1 is a diagram of process control system 10 including field devices comprising transmitter 12 and valve controller 14 connected to process pipe 16. Transmitters 12 and 14 are coupled to a two wire process control loop 18 which operates in accordance with the Fieldbus standard and is terminated at terminator 19. Field devices 12 and 14 are in communication with control room 20 through loop 18. Field devices 12 and 14 monitor process variables such as temperature and flow rate using sensors (not shown in FIG. 1) and control the process using valves (not shown in FIG. 1), for example, which extend into process fluid carried in pipe 16. Information is exchanged between control room 20 and field devices 12 and 14 in accordance with the Fieldbus standard.

The Fieldbus standard is a proposed specification promulgated by the Fieldbus foundation. The process interface specification is defined in "The Fieldbus Foundation, Fieldbus Specification, Function Block Application Process Parts 1 and 2", Documents FF94-890 and FF-94-891, Revision Hi Final 2.0, Jan. 2, 1996. The Fieldbus standard is an open standard which provides communication between process I/O hardware and the Fieldbus interface through an arbitrary number of data channels, each having an arbitrary number of parameters associated therewith. A Fieldbus process interface specification (transducer block) appears as shown in Table 1:

TABLE 1

| Channel Data |
| --- |
| Parameter 1 |
| Parameter 2 |
| Parameter 3 |
| . |
| . |

TABLE 1-continued

| Channel Data |
|---|
| Parameter N |

Fieldbus interface circuitry in the transmitter reads and writes the channel data and parameters 1-N through software constants termed "function blocks" in the Fieldbus Foundation Specification.

The present invention provides conversion circuitry for a transmitter coupled to a process control loop operating in accordance with the Fieldbus standard. The Fieldbus protocol is used to transmit three parameters, I/O Read/Write, I/O Control and I/O Event over the process control loop. In one preferred embodiment, the I/O Read/Write forms a channel as set forth in the Fieldbus protocol and the I/O Control and the I/O Event data form parameters for that channel. This format is shown in Table 2:

TABLE 2

| I/O Read/Write |
|---|
| I/O Control |
| I/O Event |

Conversion circuitry in the transmitter includes three registers for the I/O Read/Write, I/O Control and I/O Event data. The conversion circuitry converts these three parameters received from the Fieldbus standard into a command format appropriate for operating a transmitter. For example, in one preferred embodiment the command format is specified by the HART® protocol.

Figure 2:
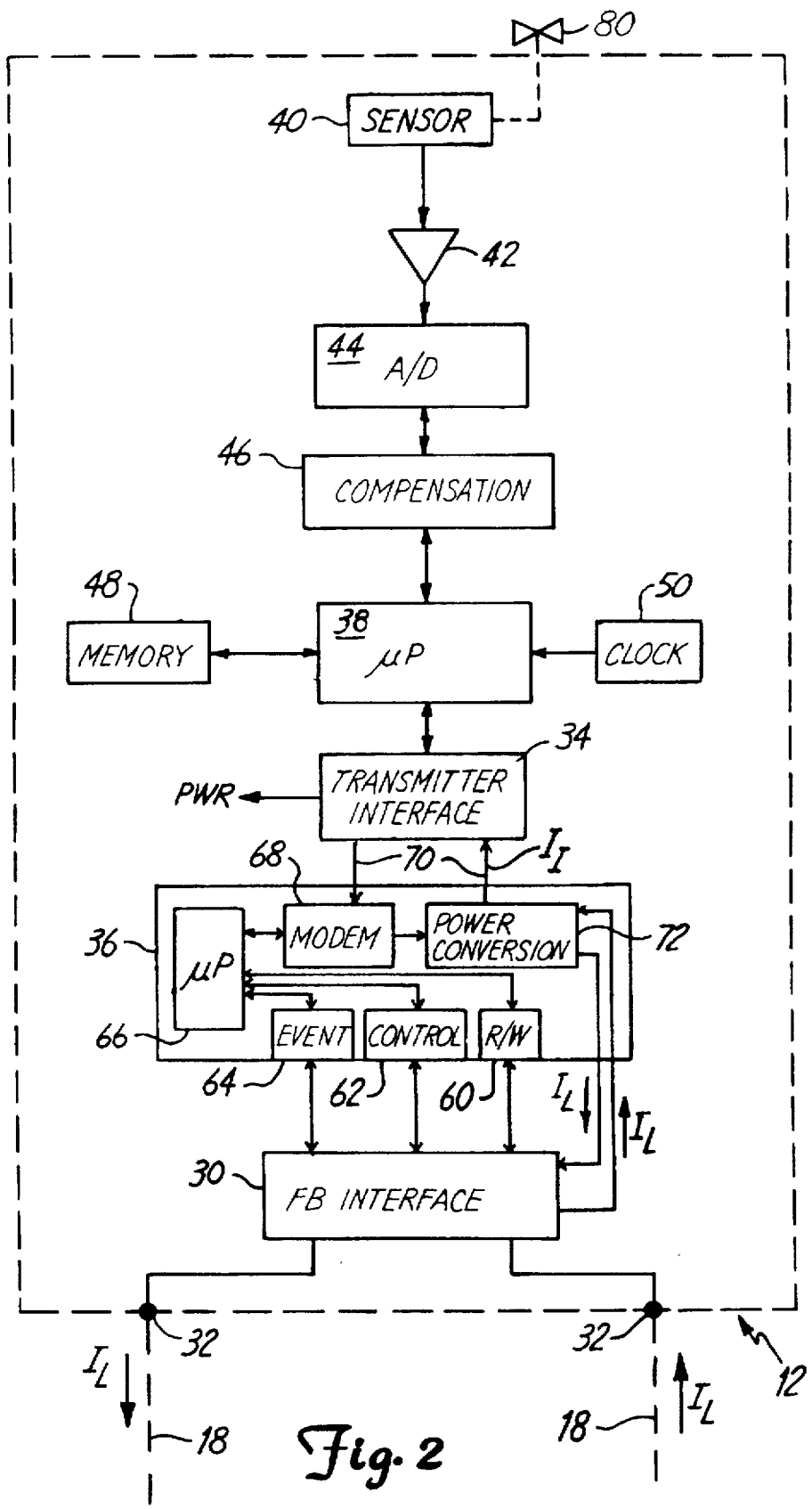
FIG. 2 is a block diagram of a transmitter of FIG. 1 including conversion circuitry in accordance with one embodiment of the invention.

FIG. 2 is a block diagram showing a more detailed view of transmitter 12 from FIG. 1. Transmitter 12 includes Fieldbus interface circuitry 30 coupled to process control loop 18 at transmitter terminals 32. Loop 18 carries loop current $I_L$ which is in accordance with the Fieldbus standard. Fieldbus interface circuitry 30 couples to transmitter interface circuitry 34 through conversion circuitry 36 in accordance with the present invention. Transmitter 12 also includes microprocessor 38 which receives a process variable from process variable sensor 40, for example process pressure or temperature. The output from sensor 40 is amplified by amplifier 42 and digitized by analog to digital converter 44. Compensation circuitry 46 receives the digitized process variable and preprocesses the variable prior to transmission to microprocessor 38. Microprocessor 38 operates in accordance with instructions stored in memory 48 and at a clock rate determined by system clock 50.

Conversion circuitry 36 includes I/O Read/Write register 60, I/O Control register 62 and I/O Event register 64 coupled to Fieldbus interface circuitry 30 and to conversion microprocessor 66. Microprocessor 66 couples to modem 68. In one embodiment this provides bidirectional communication. An internal control loop 70 is formed between transmitter interface circuitry 34, modem 68 and power control circuitry 72 and carries internal loop current $I_I$. Power conversion circuitry 72 connects to Fieldbus interface circuitry 30 and receives loop current $I_L$.

In operation, microprocessor 38 receives digitized process variables from sensor 30 which are compensated by compensation circuitry 46. Microprocessor 38 provides the process variable to transmitter interface 34. In one preferred embodiment, transmitter interface 34 operates in accordance with the HART® protocol. Transmitter interface 34 digitally transmits the process variable on loop 70 such that the process variable is received by modem 68 which provides the HART® command information to microprocessor 66. Microprocessor 66 places the process variable information in I/O Read/Write register 60 which is accessed by Fieldbus interface circuitry 30. Fieldbus interface circuitry 30 receives the process variable from register 60 and formats it into the channel position set forth in the Fieldbus protocol. The process variable is then transmitted on loop 18 using the Fieldbus protocol.

Internal current $I_I$ flowing through loop 70 is generated by power conversion circuitry 72 from loop current $I_L$ received from loop 18. Power conversion circuitry 72 is used to step up the voltage drop which appears across internal loop 70 to a voltage level appropriate to operate transmitter interface 34 which provides a power output to power circuitry and transmitter 12.

Conversion circuitry 36 is also used to convert Fieldbus information received from loop 18 into a format for use with transmitter interface 34. Fieldbus interface 30 receives a Fieldbus data packet which contains control information transmitted in one of the parameter positions of the data packet. Such control information could be a request that transmitter 14 report its type and model number. In one implementation, such request is a HART® request. The Fieldbus interface circuitry 30 places the control information into I/O Control register 62.

Microprocessor 66 reads the data from register 62 and transmits/formats the HART® command onto internal control loop 70 using modem 68. Transmitter interface 34 decodes the HART® command and passes the interrogation request to microprocessor 38. Microprocessor retrieves the appropriate information from memory 48 and provides the response to transmitter interface 34. Transmitter interface 34 formats the response in accordance with the HART® protocol for transmission over internal loop 70. Modem 68 receives the response and provides the response to microprocessor 68. Microprocessor 68 writes the response information into the I/O Read/Write register. I/O Event register 64 allows alarms and events to be communicated between the transmitter interface circuitry and the Fieldbus circuitry which is read by Fieldbus interface circuitry 30. Fieldbus interface circuitry 30 formats the appropriate Fieldbus packet for transmission onto loop 18 and places the response information into the appropriate parameter location of the Fieldbus data transmission. Examples of information which is placed into I/O Read/Write register 60 includes reading process variable such as pressure, temperature and writing actuator outputs. Examples of information which would be placed in I/O Event register 64 includes alarms from sensor limits being exceeded, diagnostic information. Examples of information placed in I/O control register 62 includes upper and lower limits and damping.

It will be understood that the separate arrangement of interface circuitry 30, 34 and conversion circuitry 36 is provided for the purpose of explanation. These elements and their functions may be implemented together or in combinations and share many elements such as memory between each other.

Fieldbus interface circuitry 30 is shown as a block element for simplicity. The Fieldbus standard referenced above set forth numerous function blocks, objects, and data paths in greater detail. The present invention relates to the "transducer block" identified in the Fieldbus standard. Elements shown to the left of a Fieldbus interface circuitry 30 form the transducer block set forth in the Fieldbus standard.

It should be understood that the embodiment of FIG. 2 encompasses other types of field devices such as control devices, for example a valve controller, or positioner. In this embodiment element 40 is a control element coupled to valve 80 and responsively controls the position of valve 80 based upon a command output generated by amplifier 42 and a digital to analog converter 46. The output of control element 40 is, for example, pressurized air to control valve 80. The desired position of valve 80 is determined by commands received from control room 20 transmitter in the I/O Read/Write channel of the Fieldbus protocol. Additionally, microprocessor 38 can include a control function to directly generate the control output as described in U.S. Pat. No. 5,485,400, issued Jan. 16, 1996 to Warrior et al., entitled *FIELD MOUNTED CONTROL UNIT*. Furthermore, it will be understood that field device 12 may include any number or combination of sensors and control elements.

One aspect of the present invention provides backward compatibility with prior art transmitter circuitry which operates in accordance with a transmitter command protocol such as the HART® protocol. Thus, a prior art transmitter can be upgraded to operate on a Fieldbus process control loop by adding Fieldbus interface circuitry 30 and conversion circuitry 36 to transmitter 12. It will be apparent that the interface may be modified to support other protocols such as those used in equipment made by Bailey, Foxboro and other manufacturers.

FIG. 2 shows conversion circuitry 36 implemented in a physical embodiment. Another embodiment of the invention includes implementation of conversion circuitry in a logical form. In this embodiment, the Fieldbus interface circuitry 30, conversion circuitry 36 and transmitter interface circuitry 34 are merged into a single unit. In this embodiment, software replaces the function of conversion circuitry 36 such that Fieldbus data received from loop 18 is placed into the appropriate register 60, 62 or 64 in software. The software translates the information contained in software registers 60, 62 or 64 into the appropriate command for use in microprocessor 38. Similarly, microprocessor 38 transmits information on loop 18 by placing I/O Read/Write data, I/O Control data and I/O Event data into the appropriate software register for transmission. This software interface can be implemented on top of a shared-memory physical implementation such as a dual ported RAM, a physical channel such as a HART-to-HART interface, or others. In a preferred embodiment, the software is executed by microprocessor 38 or 66.

Figure 3:
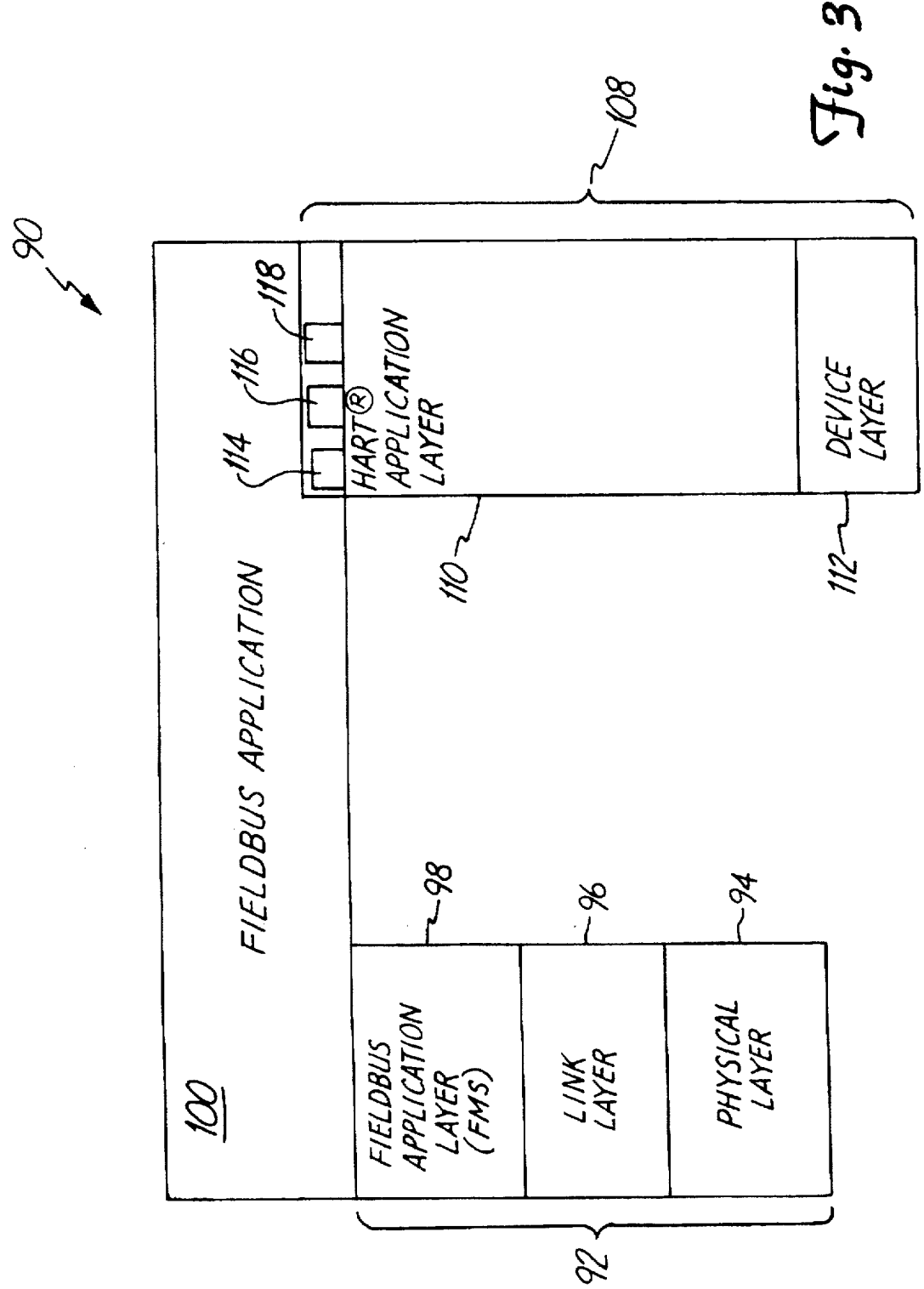
FIG. 3 is a block diagram showing a logical implementation in accordance with one embodiment of the invention.

FIG. 3 is a block diagram 90 showing a software implementation in accordance with one embodiment. Fieldbus interface layer 92 includes Fieldbus physical layer 94, Fieldbus link layer 96 and Fieldbus application layer (Fieldbus messengering layer or FMS) 98. Fieldbus interface layer 92 couples to Fieldbus application 100 which couples to transducer block 108. Transducer block 108 includes, in one preferred embodiment, HART® layer 112. Transducer block 108 includes I/O Read/Write register 114 and I/O Control register 116 and I/O Event register 118.

In operation, Fieldbus physical layer 94 couples to Fieldbus control loop 18. Link layer 96 couples physical layer 94 to Fieldbus application layer (FMS) 98. Fieldbus application 100 interfaces with FMS 98. In accordance with the invention, Fieldbus application 100 interfaces to I/O Read/Write register 102, I/O Control register 104 and I/O Event register 106. Fieldbus application 100 passes these three parameters onto transducer layer 108 without the requirement that the parameters be translated or mapped into a different protocol. In one preferred embodiment, transducer block 108 is adapted for receipt of commands in accordance with the HART® protocol and includes a HART® application 110 which receives data in I/O Read/Write register 114, I/O Control register 116 and I/O Event register 118. These parameters are passed directly to a device layer which controls operation of the field device. Note that in this embodiment the invention does not require the use of any additional gateways, application layers, link layers or physical layers.

Although the present invention has been described with reference to preferred embodiments, workers skilled in the art will recognize that changes may be made in form and detail without departing from the spirit and scope of the invention. For example, the invention may be implemented in any type of field device such as a controller or transmitter. Various combinations and arrangements of the three registers may be used to define the channel and parameter data under the Fieldbus protocol. In addition instead of the HART® application layer, other application layers can be used that provide Read, Write, Event and Control function. Other protocols, such as MODBUS, Honeywell DE, Bailey, Foxboro, Profibus, Devicenet, or any other protocol may be employed that provides these functions. Further, it should be clear that the invention will support multiple transducers through multiple channels or multiple transducer blocks for sending or receiving process variables or control information. As used herein, the term control element is intended to include a valve actuator, an I/P, a positioner, a solenoid, a motor, or any other equivalent actuating device. Although the specifications refer to the Fieldbus Foundation implementation, it should be understood that the invention covers any implementation of the specifications defined by the IEC 65C WG6 and ISA-SP-50 for Fieldbus.

What is claimed is:

1. A transmitter in a process control system, comprising:

a transducer for sensing a process variable and providing a transducer output;

measurement circuitry coupled to the transducer output to process the transducer output and provide a measured output;

transmitter interface circuitry coupled to the measurement circuitry adapted to provide an interface output representative of the measured output and to receive a transmitter command and respond in accordance with the transmitter command;

Fieldbus interface circuitry adapted to couple to a process control loop operating in accordance with the Fieldbus standard, the Fieldbus interface circuitry coupled to I/O registers supporting Read, Write, Control and Event data, the Fieldbus interface circuitry responsively writing Fieldbus data received from the process control loop into the I/O registers and responsively transmitting Fieldbus data on the process control loop data read from the I/O registers; and conversion circuitry coupled between the Fieldbus interface circuitry and the transmitter interface circuitry adapted to write data into the I/O registers, related to the interface output received from the transmitter interface circuitry.

2. The transmitter of claim 1 wherein the transmitter interface circuitry couples to the conversion circuitry over an internal communication circuit loop which carries information in accordance with the HART communication protocol.

3. The transmitter of claim 1 wherein the conversion circuitry includes communication circuitry which communicates with the transmitter interface circuitry on an internal communication circuit.

4. The transmitter of claim 1 including an I/O Read/Write register which provides a transducer block channel in accordance with the Fieldbus communication protocol.

5. The transmitter of claim 1 including an I/O Read/Write register which stores the process variable from the transducer output.

6. The transmitter of claim 1 including a microprocessor to implement the transmitter interface circuitry, Fieldbus interface circuitry and conversion circuitry in accordance with instructions stored a memory.

7. The transmitter of claim 6 wherein the software provides at least a Fieldbus application and a HART application layer.

8. The transmitter of claim 1 including an I/O Read/Write register which contains process variables, an I/O Control register which contains control commands to control operation of the transmitter and an I/O Event register which contains information related to the occurrence of a predetermined event.

9. The transmitter of claim 8 wherein the predetermined event comprises an alarm condition in the transmitter interface, measurement circuitry or transducer.

10. The transmitter of claim 8 wherein the predetermined event is determined from a command received over the process control loop in the I/O Control register.

11. A field device in a process control system, comprising:
a control element for receiving a control input and responsively controlling a process;
control circuitry coupled to the control input to control the process in response to a command input;
field device interface circuitry coupled to the control circuitry adapted to provide the command input in response to a field device command;
Fieldbus interface circuitry adapted to couple to a process control loop operating in accordance with the Fieldbus standard, the Fieldbus interface circuitry coupling to I/O registers supporting Read, Write, Control, and Event data, the Fieldbus interface circuitry responsively writing Fieldbus data received from the process control loop into the I/O registers and responsively transmitting Fieldbus data on the process control loop data read from the I/O registers; and
conversion circuitry coupled between the Fieldbus interface circuitry and the field device interface circuitry adapted to data read from the I/O registers and responsively provides the field device command to the field device interface circuitry.

12. The field device of claim 11 wherein the field device interface circuitry couples to the conversion circuitry over an internal communication circuit which carries information in accordance with the HART communication protocol.

13. The field device of claim 11 wherein the conversion circuitry includes communication circuitry which communicates with the field device interface circuitry on an internal communication circuit.

14. The field device of claim 11 including an I/O Read/Write register which provides a channel in accordance with the Fieldbus communication protocol.

15. The field device of claim 11 including an I/O Read/Write register which stores the field device command received from the process control loop.

16. The field device of claim 11 including a microprocessor to implement the field device interface circuitry, Fieldbus interface circuitry and conversion circuitry in accordance with instructions stored a memory.

17. The field device of claim 16 wherein the software provides at least a Fieldbus application and a HART application layer.

18. The field device of claim 11 including an I/O Read/Write register which contains field device commands, an I/O Control register which contains control commands to control operation of the field device and an I/O Event register which contains information related to the occurrence of a predetermined event.

19. The field device of claim 18 wherein the predetermined event comprises an alarm condition in the field device.

20. The field device of claim 18 wherein the predetermined event is determined from a command received over the process control loop in the I/O Control register.

21. The transmitter of claim 1 including multiple transducers communicating over the process control loop through the Fieldbus interface circuitry.

22. The transmitter of claim 1 including a control element communicating over the process control loop through the Fieldbus interface circuitry.

23. The field device of claim 11 including multiple control elements communicating over the process control loop through the Fieldbus interface circuitry.

24. The field device of claim 11 including a transducer communicating over the process control loop through the Fieldbus interface circuitry.

* * * * *

UNITED STATES PATENT AND TRADEMARK OFFICE
CERTIFICATE OF CORRECTION

PATENT NO. : 5,764,891
DATED : June 9, 1998
INVENTOR(S) : Jogesh Warrior

It is certified that error appears in the above-indentified patent and that said Letters Patent is hereby corrected as shown below:

Title page,
Under [56] References Cited
U.S. PATENT DOCUMENTS

Change
"4,855,805" to --4,855,905--.

Signed and Sealed this

Ninth Day of March, 1999

Attest:

Q. TODD DICKINSON

*Attesting Officer*     *Acting Commissioner of Patents and Trademarks*